(12) United States Patent
Peng et al.

(10) Patent No.: US 8,985,869 B1
(45) Date of Patent: Mar. 24, 2015

(54) PLUGGABLE OPTICAL PASSIVE DEVICES

(71) Applicant: Alliance Fiber Optic Products, Inc., Sunnyvale, CA (US)

(72) Inventors: Bruce Peng, Fremont, CA (US); Charlie Xiao, Fremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 144 days.

(21) Appl. No.: 13/850,034

(22) Filed: Mar. 25, 2013

Related U.S. Application Data

(60) Provisional application No. 61/686,273, filed on Apr. 3, 2012.

(51) Int. Cl.
*G02B 6/36* (2006.01)
*G02B 6/38* (2006.01)
*G02B 6/293* (2006.01)

(52) U.S. Cl.
CPC .......... *G02B 6/3897* (2013.01); *G02B 6/29383* (2013.01)
USPC .............................................. 385/88; 398/85

(58) Field of Classification Search
CPC .................. G02B 6/29383; G02B 6/29382
See application file for complete search history.

(56) References Cited

U.S. PATENT DOCUMENTS

| | | | | |
|---|---|---|---|---|
| 5,583,683 A * | 12/1996 | Scobey | | 398/79 |
| 6,201,909 B1 * | 3/2001 | Kewitsch et al. | | 385/37 |
| 7,184,215 B2 * | 2/2007 | Pelekhaty | | 359/588 |
| 7,639,946 B2 * | 12/2009 | Bouda | | 398/68 |
| 7,665,901 B2 * | 2/2010 | Kewitsch | | 385/73 |
| 8,308,375 B2 * | 11/2012 | Xia et al. | | 385/89 |
| 8,351,791 B1 * | 1/2013 | Wang et al. | | 398/85 |
| 2002/0196491 A1 * | 12/2002 | Deng et al. | | 359/124 |
| 2003/0031423 A1 * | 2/2003 | Zimmel | | 385/73 |
| 2008/0205825 A1 * | 8/2008 | Grzegorzewska | | 385/60 |
| 2010/0104243 A1 * | 4/2010 | Kewitsch | | 385/60 |
| 2011/0026123 A1 * | 2/2011 | Lee et al. | | 359/590 |
| 2011/0043793 A1 * | 2/2011 | Xia et al. | | 356/218 |
| 2013/0057854 A1 * | 3/2013 | Xia et al. | | 356/225 |

\* cited by examiner

*Primary Examiner* — Rhonda Peace
(74) *Attorney, Agent, or Firm* — Wuxi Sino IPs Agency, Ltd.; Joe Zheng

(57) ABSTRACT

Designs of pluggable optical passive devices are described. Such a pluggable optical passive device can be inserted into an existing configuration. According to one embodiment, the pluggable optical passive device is formed as an elongated enclosure with one or two first connectors on one side thereof and one or two second connectors on the other side thereof. The first connectors are provided to be coupled to female pluggers while the second connectors are provided to be coupled to male pluggers. Depending on implementation, the first and second connectors may be glued onto or skewed into the enclosure through holes, and may be further extended by a flexible pigtailed dual LC connector.

11 Claims, 9 Drawing Sheets

2-in-1 isolator in RIGID small form factor package

Dual isolators in RIGID small form factor package 2-in-1 isolator in FLEXIBLE small form factor package Dual isolators in FLEXIBLE small form factor package

PLUGGABLE OPTICAL PASSIVE DEVICES

CROSS-REFERENCE TO RELATED APPLICATION

This application claims the benefits of U.S. Provisional Application No. 61/686,273, filed Apr. 3, 2012, and entitled "2×2 pluggable small form factor platform for optical passives", which is hereby incorporated by reference for all purposes.

BACKGROUND OF THE INVENTION

1. Field of the Invention

The invention is generally related to the area of optical communications. In particular, the invention is related to pluggable optical passive devices.

2. The Background of Related Art

To meet the ever-increasing demands for high bandwidth and more flexibility in modern communication networks, utilizing optical fiber networks capable of transmitting multiplexed channel signals is becoming increasingly popular. Many optical devices have been designed to meet the demands. Among the optical devices, pluggable optical units are key elements in many applications of optical fiber communications. A cost-effective and reliable optical pluggable unit having low insertion loss and versatile function with flexibility is often required. FIG. 1 duplicates FIG. 1 of U.S. Pat. No. D467,544 to show a small form-factor pluggable optical transceiver module.

Optical add/drop devices are those elements often used in optical systems and networks. For example, an exchanging of data signals involves the exchanging of matching wavelengths from two different sources within an optical network. In other words, the multi-channel signal would drop a wavelength while simultaneously adding a channel with a matching wavelength at the same network node. FIG. 2 duplicates FIG. 2 of US Pat. Pub. No.: 2006/0018593 A1 to show the concept of add/drop function in the optical add/drop devices.

Typically the add/drop function is realized with bulky LGX or rack modules and rarely in small form factor, although there are some configurations with multiple SFP form factor devices. One example is shown in FIG. 3 that duplicates FIG. 3 of US Pat. Pub. No.: 2009/0154930 A1.

Pluggable devices are widely available in electronic forms these days. A device that belongs to the pluggable category typically needs to be turned on and functioning as soon as it is inserted into an electrical connector receptacle or adaptor port. When it is unplugged from such a receptacle, neither the system that hosts the pluggable device nor the pluggable device itself will be damaged. Pluggable devices may be added or removed from a system without interrupting the synchronization between the devices and the system. Therefore, it is not required to have a power reset when replacing or upgrading such devices. Pluggable devices add on a good deal of system application upgrade flexibilities and are becoming more and more popular for electronics.

The advances in opto-electronics also allow people to expand communication transmitters and receivers or the so-called transceivers and transponders into the pluggable domain. Various formats for such devices are being proposed: Small Form Pluggable (SFP) is an example. Other examples that allow pluggable applications include XFP, I2C, RS-232, USB, Dual-port RAM, and Ethernet.

This invention disclosure intends to introduce a stand-alone small form factor device to fulfill the functionality of adding or dropping a channel signal and to be added into the pluggable application categories.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention is related to a pluggable optical passive device that can be inserted into an existing configuration. According to one embodiment, the pluggable optical passive device is formed as an elongated enclosure with one or two first connectors on one side thereof and one or two second connectors on the other side thereof. The first connectors are provided to be coupled to female pluggers while the second connectors are provided to be coupled to male pluggers. Depending on implementation, the first and second connectors may be glued onto or skewed into the enclosure through holes, and may be further extended by a flexible pigtailed dual LC connector.

The present invention may be implemented as a method, an apparatus or a part of a system. According to one embodiment, the present invention is a pluggable optical passive device comprising: an elongated enclosure provided to house one or two optical components; two first connectors respectively to receive two female plugs, wherein the two first connectors are disposed on one end of the elongated enclosure and fixed thereto by epoxy, and coupled to the one or two optical components on one end thereof; and two second connectors respectively to receive two male plugs, wherein the two second connectors are disposed on another end of the elongated enclosure and fixed thereto by epoxy, and coupled to the one or two optical components on another end thereof. In one application, the pluggable optical passive device provides an add/drop function to add a component signal from an external source and drop a component signal to the external source, wherein the component signal from the external source and the component signal to the external source have a substantially similar wavelength at which the each of the filters is configured to pass through and reflect others.

According to another embodiment, the present invention is a pluggable optical passive device comprising: an elongated enclosure provided to house two optical filters; two first connectors respectively to receive two female plugs, wherein the two first connectors are disposed on one end of the elongated enclosure and fixed thereto by epoxy, and coupled to one of the two optical filters on one end thereof; and two second connectors respectively to receive two male plugs, wherein the two second connectors are disposed on another end of the elongated enclosure, and coupled to the one of two optical filters on another end thereof, the two second connectors are extended by a flexible pigtailed dual LC connector.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 4-10B. However, those skilled in the art will readily appreciate that the detailed description given herein with respect to these figures is for explanatory purposes as the invention extends beyond these limited embodiments.

Figure 1:
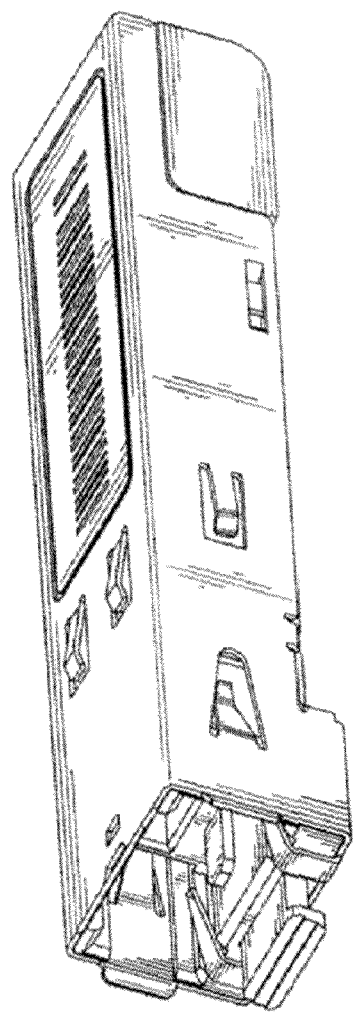
FIG. 1 duplicates FIG. 1 of U.S. Pat. No. D467,544 to show a small form-factor pluggable optical transceiver module.
Figure 2:
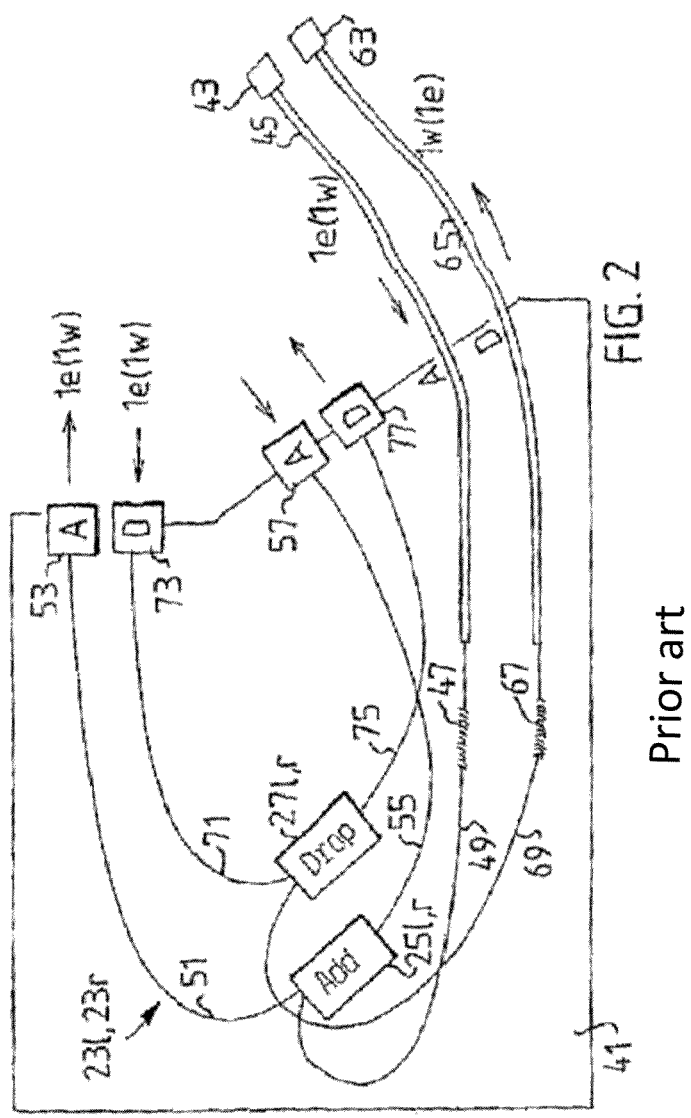
FIG. 2 duplicates FIG. 2 of US Pat. Pub. No.: 2006/0018593 A1 to show the concept of add/drop function in the optical add/drop devices.
Figure 3:
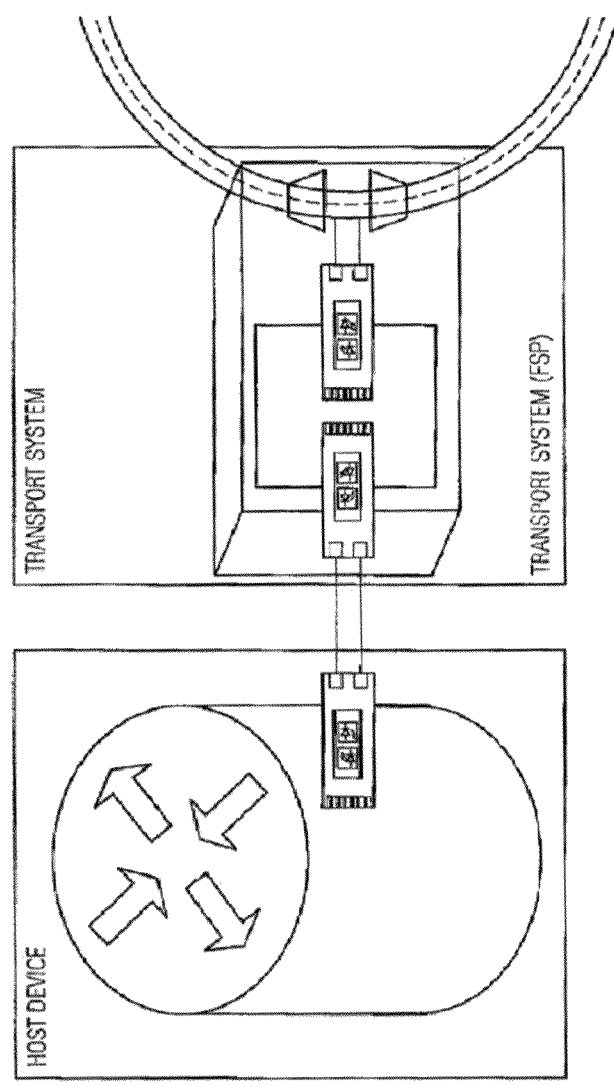
FIG. 3 duplicates FIG. 3 of US Pat. Pub. No.: 2009/0154930 A1.
Figure 4:
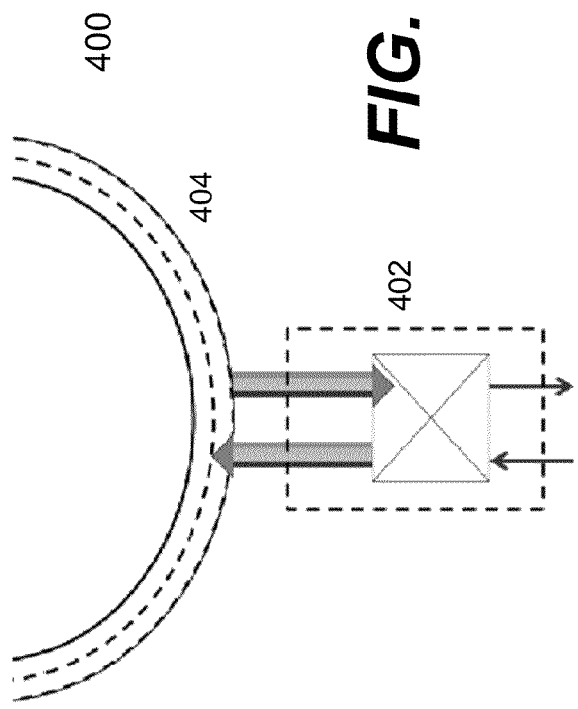
FIG. 4 shows an exemplary system diagram in which one embodiment of the present invention may be practiced.

Referring now to the drawings, in which like numerals refer to like parts throughout the several views. FIG. 4 shows an exemplary system diagram 400 in which one embodiment of the present invention may be practiced. According to the embodiment, it is a single unit 402 in pluggable and small form factor. The unit 402 is a pluggable add/drop device having ports to add and drop one or more channel signals. For simplicity, a signal component with a selected wavelength or a band signal will be deemed or described as a signal component, a channel or a wavelength signal hereinafter. The unit or device 402 is provided to drop one channel signal to the main loop (a network 404 represented as a half circle) and then add another channel signal from the main loop back to the device 402.

Figure 5:
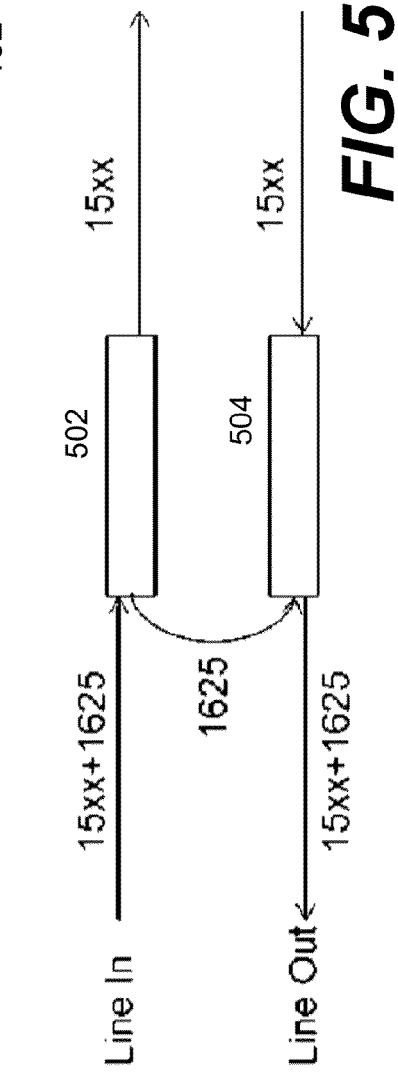
FIG. 5 illustrates an exemplary internal functionality of an optical passive device and shall be understood in conjunction with FIG. 4.

FIG. 5 illustrates an exemplary internal functionality of the unit 402 and shall be understood in conjunction with FIG. 4. In operation, a light beam carrying two channel signals with two respective exemplary wavelengths, 1530 nm and 1625 nm, where 15xx is used in FIG. 5 to indicate some variations in wavelengths. As shown in FIG. 5, the light beam is carrying two signal components, where the component signal of 1530 nm is to be dropped to the network 404 of FIG. 4. The output from the device 402 is to pick up another signal component, also at 1530 nm, from the network 404.

In operation, a light beam is coupled onto a filter 502 of the unit 402, where the filter 502 is designed to pass the signal component of 1530 nm through and reflects all others. As a result of some optical arrangement (e.g., mirror or fiber) that is not shown in FIG. 5, the signal component of 1625 nm is reflected by the filter 502 to another filter 504 that is also designed to pass the signal component of 1530 nm through and reflects all others. Meanwhile, a signal component from the network 404 is coupled to the filter 504 to be added with the signal component of 1625 nm. Since the filter 504 passes the signal component at 1530 nm from the network 404 and reflects the signal component at 1625 nm, after the filter 504, the two signal components are added and output from the unit 402. In other words, the input and the output signals are different in one component.

Figure 6:
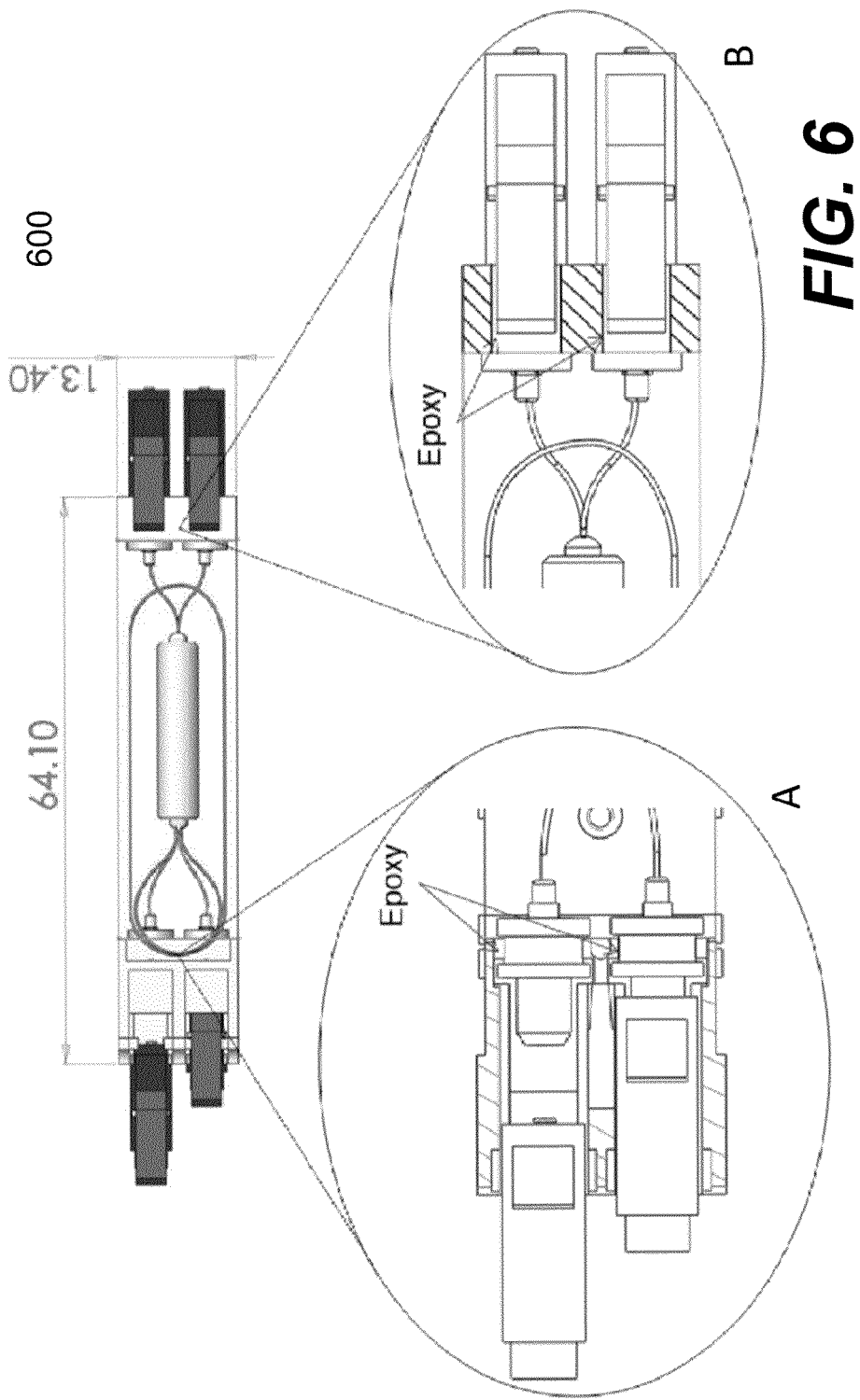
FIG. 6 shows an exemplary internal structure of an exemplary pluggable optical passive device with explored sectional drawings to show the details thereof, according to one embodiment of the present invention.

FIG. 6 shows an exemplary internal structure 600 of the unit 402 with explored sectional drawings to show the details thereof, according to one embodiment of the present invention. One of the key elements in the structure 600 is a 2-in-1 single channel or 2 single channels routed with a bend insensitive fiber (BIF) (e.g., Corning Clearcurve fiber with 5 mm bending radius from Corning Incorporated). One of the advantages and benefits of using one or more bendable fibers is to provide some flexibility of reworking if necessary. The entire structure may be in a small form factor cassette which has similar width and height as a standard SFP transceiver. In one embodiment, the length of the structure 600 is slightly longer than a standard SFP transceiver. As shown in the explored view A in FIG. 6, this special package has 2 male LC type connectors on one side and 2 male ferrules fixed in adapter form embedded in the housing on the other side. This device 600 can be easily installed or plugged to many current modules for standard SFP transceivers as the width and height are substantially similar to a standard SFP transceiver.

Figure 7:
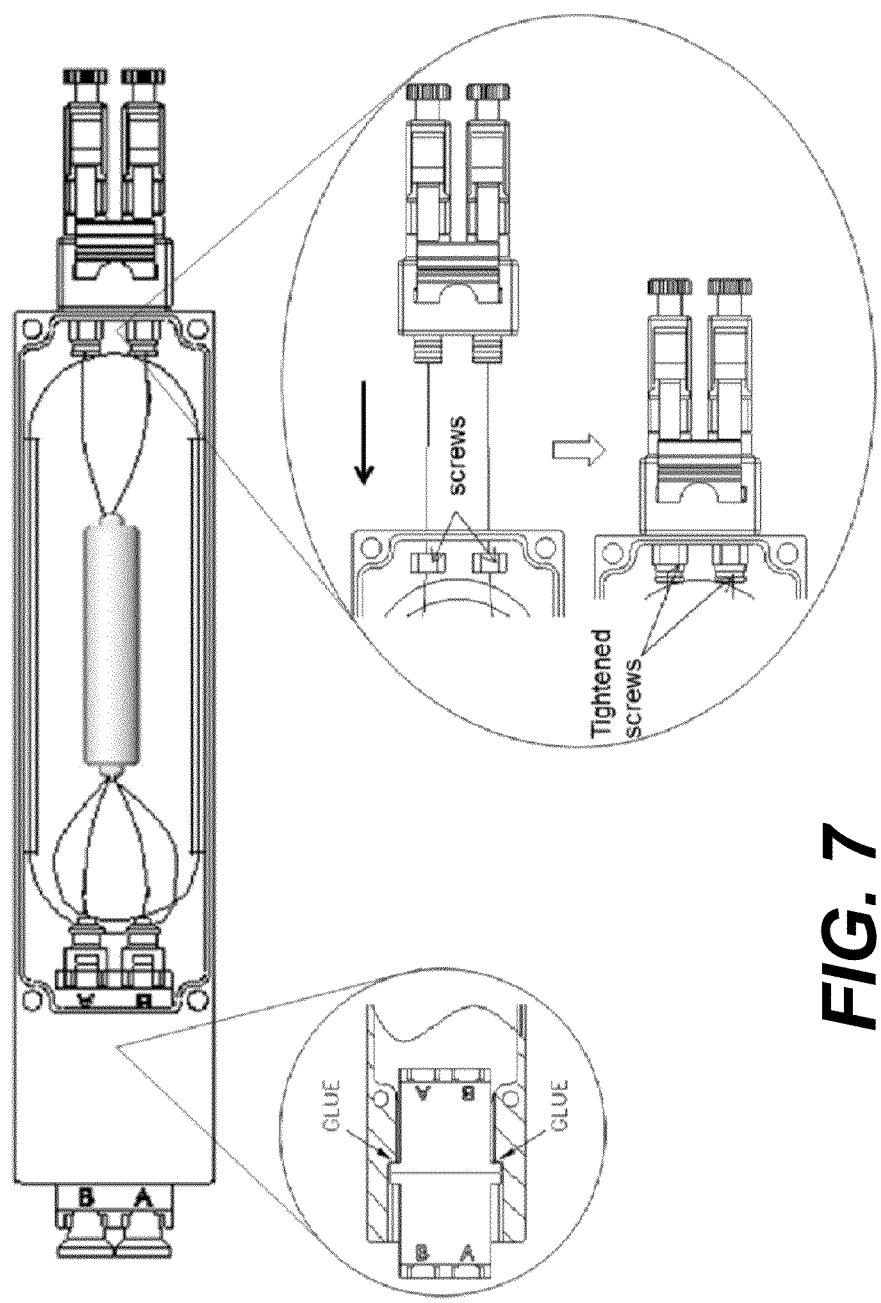
FIG. 7 shows an exemplary fixation that can be done with epoxy glue for a dual LC adapter and uses screws for the male connectors.

According to one embodiment, the fixation of the male ferrule on the embedded adapter side and the male connector is shown in the explored detail A in FIG. 6, using epoxy to secure the male connectors and ferrule in the housing. In another embodiment, the fixation can be done with epoxy glue for a dual LC adapter and uses screws for the male connectors, which is shown in FIG. 7. The adapter is glued in the housing with epoxy and the male connector is a dual LC and screwed to the housing by two screws. This type of fixation may need slightly larger package comparing with the rigid package in FIG. 6.

Figure 8A:
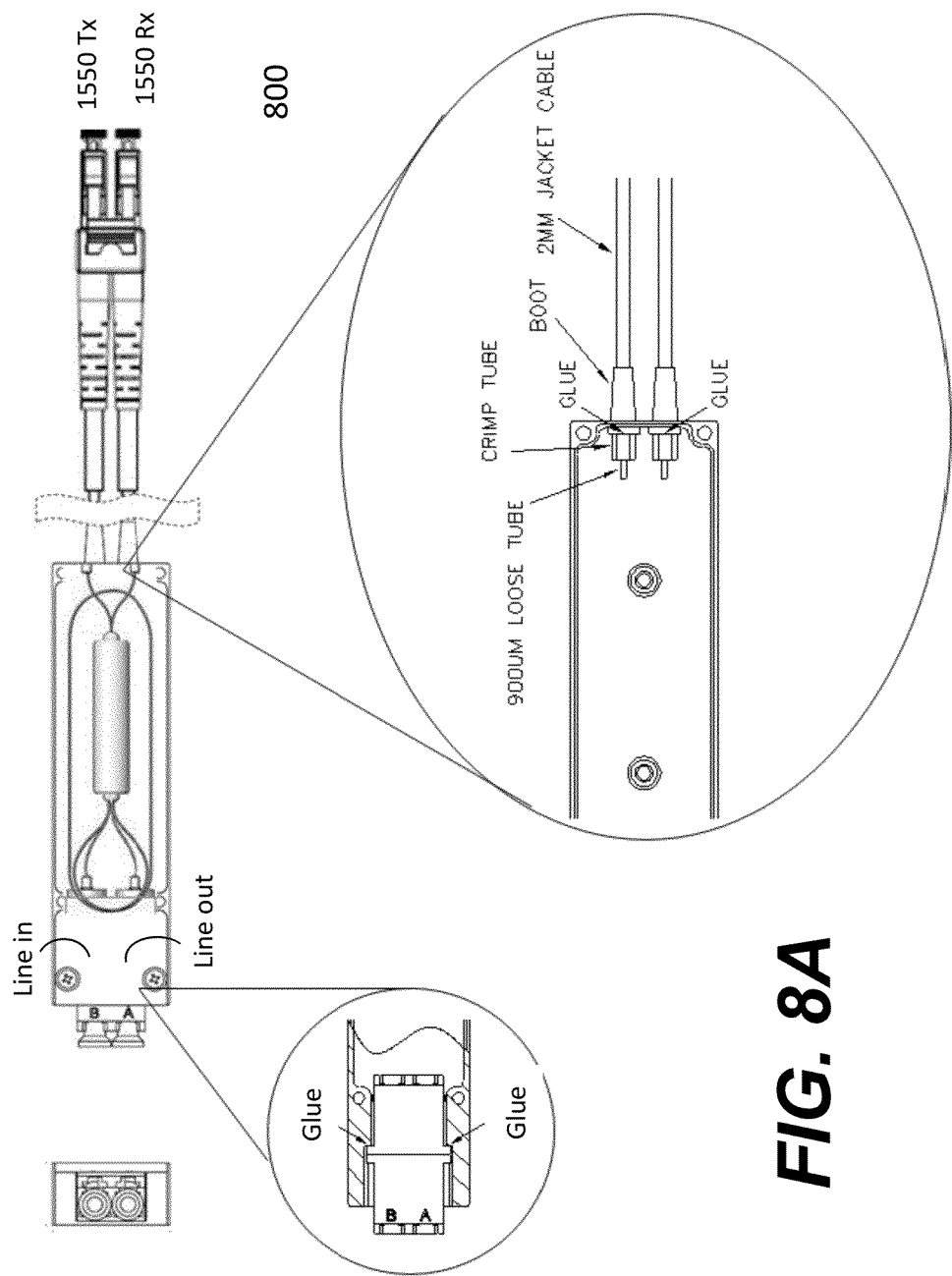
FIG. 8A shows a flexible small form-factor package.
Figure 8B:
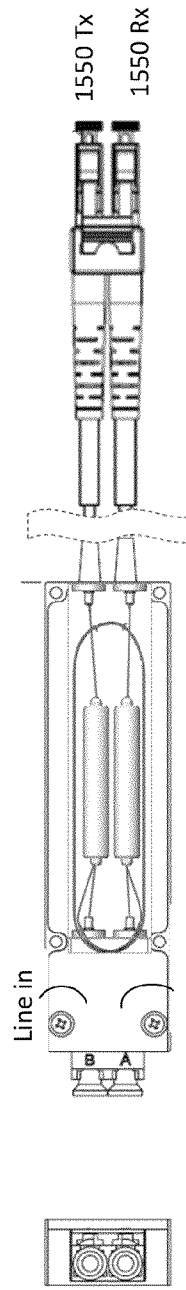
FIG. 8B shows a similar structure for 2 single channels routed with a bend insensitive fiber (BIF)

According to one embodiment of the present invention, FIG. 8A shows a flexible small form-factor package 800. As shown in the explored detail, the female adapter is glued in the housing but the male connector is connected to the housing with pigtails, wherein the pigtails are secured with a crimp tube and a rubber boot on housing exit. One of the key elements in the design shown in FIG. 8A is that there is more space occupied but a flexible pigtailed dual LC connector which targets for better fiber handling. The 2-in-1 single channel or 2pcs routed single channels are also routed compactly in the cassette. The size of the cassette may be slightly larger form factor than that of a standard SFP transceiver in length, width and/or height. In the cassette, there are two LC ferrule and adapters, and on pigtail side, and further there are dual LC male connectors. FIG. 8B shows a similar structure for 2 single channels routed with a bend insensitive fiber (BIF).

Figure 9A:
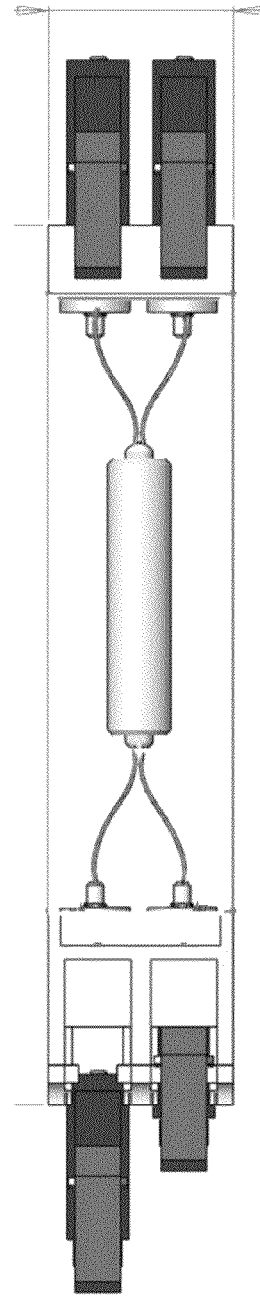
FIG. 9A and FIG. 9B show respectively two types of small form factor devices for signal isolation use, corresponding to the structure of FIG. 6.
Figure 9B:
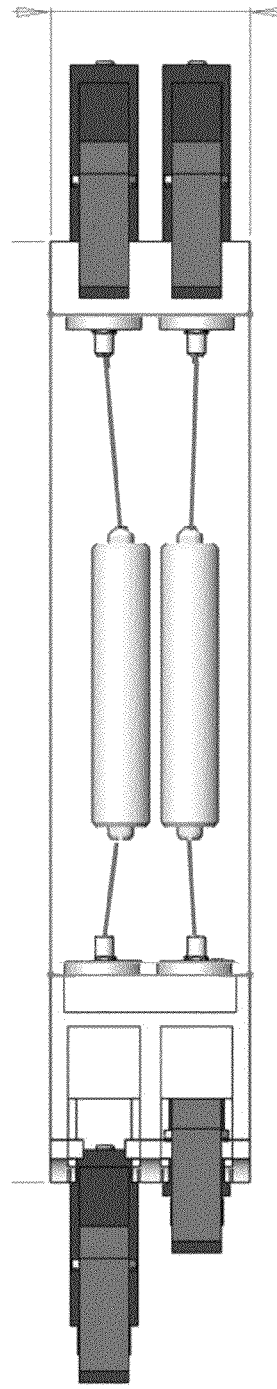
Figure 10A:
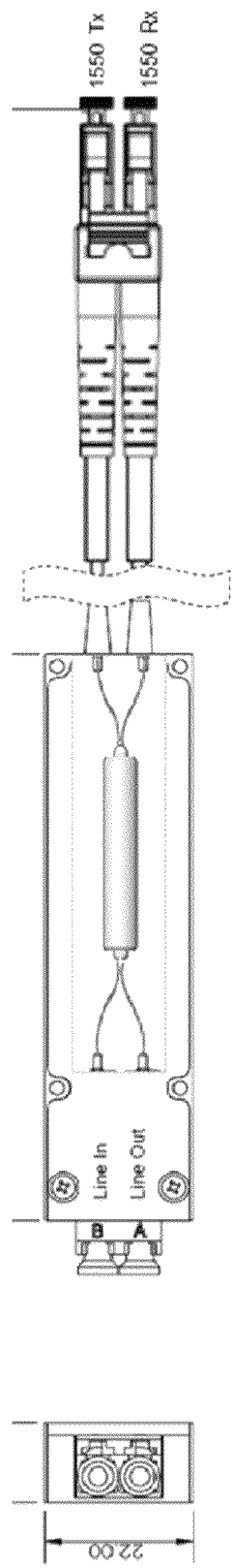
FIG. 10A and FIG. 10B show respectively two types of small form factor devices for signal isolation use, corresponding to the structure of FIG. 7.
Figure 10B:
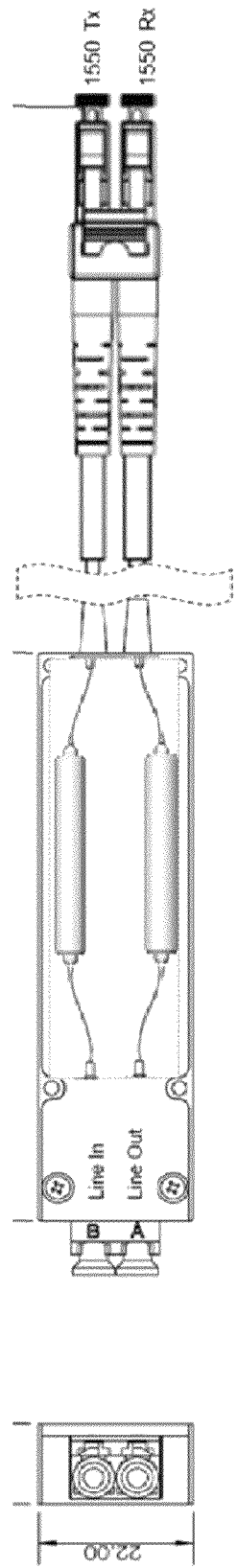

As previously described, these two types of small form factor devices shown respectively in FIG. 6 and FIG. 7 can be used for a dual isolator in one small form factor package as shown in FIGS. 9 and 10.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim is:

1. A pluggable optical passive device comprising:
   an elongated enclosure provided to house one or two optical components;
   two first connectors respectively to receive two female plugs, wherein the two first connectors are disposed on one end of the elongated enclosure and fixed thereto by epoxy, and coupled to the one or two optical components on one end thereof; and
   two second connectors respectively to receive two male plugs, wherein the two second connectors are disposed on another end of the elongated enclosure and fixed thereto by epoxy, and coupled to the one or two optical components on another end thereof, the one or two components each include two optical filters therein, each of the filters is coupled between one of the two first connectors and one of the two second connectors, and
   wherein the pluggable optical passive device provides an add/drop function to add a component signal from an external source and drop a component signal to the external source, and the component signal from the external source and the component signal to the external source have a substantially similar wavelength at which the each of the optical filters is configured to pass through and reflect others.

2. The pluggable optical passive device as recited in claim 1, wherein the pluggable optical passive device is in flexible small form-factor package.

3. The pluggable optical passive device as recited in claim 1, wherein the pluggable optical passive device is in a small form factor cassette which has similar width and height as a standard SFP transceiver.

4. The pluggable optical passive device as recited in claim 1, wherein the component signal from the external source and the component signal to the external source have a substantially similar wavelength at which the each of the filters is configured to pass through and reflect others.

5. The pluggable optical passive device as recited in claim 1, wherein the elongated enclosure provided further houses at least one bendable fiber to guide a reflected component from the one or two optical components.

6. The pluggable optical passive device as recited in claim 5, wherein each of the one or two optical components is an isolator.

7. A pluggable optical passive device comprising:
   an elongated enclosure provided to house two optical filters;
   two first connectors respectively to receive two female plugs, wherein the two first connectors are disposed on one end of the elongated enclosure and fixed thereto by epoxy, and coupled to one of the two optical filters on one end thereof; and
   two second connectors respectively to receive two male plugs, wherein the two second connectors are disposed on another end of the elongated enclosure, and coupled to the one of two optical filters on another end thereof, the two second connectors are extended by a flexible pigtailed dual LC connector.

8. The pluggable optical passive device as recited in claim 7, wherein the optical filters are packaged together to appear as a single component.

9. The pluggable optical passive device as recited in claim 7, wherein the elongated enclosure provided further houses at least one bendable fiber to guide a reflected component from one of the two optical filters to another one of the two optical filters.

10. The pluggable optical passive device as recited in claim 7, wherein the two second connectors are glued in an adaptor that is further glued onto the another end of the elongated enclosure.

11. The pluggable optical passive device as recited in claim 7, wherein the two second connectors are glued in an adaptor that is screwed into the another end of the elongated enclosure.

* * * * *